(12) United States Patent
Wang et al.

(10) Patent No.: US 12,078,197 B1
(45) Date of Patent: Sep. 3, 2024

(54) CAM ACTION CLAMP

(71) Applicants: Henry Wang, Winter Springs, FL (US);
Ralph Bagnall, Orlando, FL (US)

(72) Inventors: Henry Wang, Winter Springs, FL (US);
Ralph Bagnall, Orlando, FL (US)

( * ) Notice: Subject to any disclaimer, the term of this patent is extended or adjusted under 35 U.S.C. 154(b) by 1 day.

(21) Appl. No.: 18/416,324

(22) Filed: Jan. 18, 2024

(51) Int. Cl.
| F16B 2/14 | (2006.01) |
| F16B 13/08 | (2006.01) |
| F16B 37/04 | (2006.01) |

(52) U.S. Cl.
CPC .............. F16B 2/14 (2013.01); F16B 37/042 (2013.01); *F16B 13/0858* (2013.01); *F16B 2200/10* (2018.08); *F16B 2200/30* (2018.08); *F16B 2200/406* (2018.08); *F16B 2200/99* (2023.08)

(58) Field of Classification Search
CPC .... F16B 2/02; F16B 2/18; F16B 2/185; F16B 37/04; F16B 37/041; F16B 37/042; F16B 2200/40; F16B 2200/406
See application file for complete search history.

(56) References Cited

U.S. PATENT DOCUMENTS

| 1,685,899 | A |   | 10/1928 | Andrew |          |
| 2,430,613 | A | * | 11/1947 | Hodge  | B25B 5/08 |
|           |   |   |         |        | 269/142  |
| 2,695,434 | A | * | 11/1954 | Bedford, Jr. | F16B 5/125 |
|           |   |   |         |              | 411/176 |
| 2,704,680 | A | * | 3/1955  | Bedford, Jr. | F16B 37/041 |
|           |   |   |         |              | 24/627 |
| 4,157,819 | A |   | 6/1979  | Meyer    |          |
| 5,129,637 | A |   | 7/1992  | Ito et al. |        |
| 5,718,422 | A |   | 2/1998  | Morghen  |          |
| 6,027,106 | A |   | 2/2000  | Ray      |          |
| 10,442,058 | B2 | * | 10/2019 | Wang    | B25B 5/102 |
| 11,224,964 | B2 | * | 1/2022  | Wang    | B25H 1/08 |

(Continued)

FOREIGN PATENT DOCUMENTS

| DE |     2505637 A1 | * | 8/1976  |               |
| DE |    19950992 A1 | * | 4/2001  | ............ B23Q 3/103 |
| DE | 102006018835 A1 |   | 11/2007 |               |

(Continued)

OTHER PUBLICATIONS

CarrLane; Cam Clamps Guide; Jna. 9, 2024; https://www.carrlane.com/engineering-resources/technical-information/manual-workholding/cam-clamps; pp. 1-5; St. Louis, MO.

(Continued)

*Primary Examiner* — Jonathan P Masinick
(74) *Attorney, Agent, or Firm* — Wolter Van Dyke Davis, PLLC; Robert L. Wolter

(57) ABSTRACT

An apparatus (100), including: a hub (102) having a hub center (160); a securing mechanism (106) configured to fix the hub onto a flat surface; and an eccentric clamp disk (104). When the hub is fixed to the flat surface and nested in the eccentric clamp disk, an interlocking slip fit relationship exists between the hub and the eccentric clamp disk. The interlocking slip fit relationship enables infinite rotation of the eccentric clamp disk about the hub center and has a geometric interlock (170). The geometric interlock is configured so that when the eccentric clamp disk is pushed laterally into contact with the hub, the geometric interlock urges the eccentric clamp disk downward onto the flat surface.

20 Claims, 9 Drawing Sheets

(56) References Cited

U.S. PATENT DOCUMENTS

2023/0242277 A1* 8/2023 Bernadet .................. B64C 1/18
29/525.02

FOREIGN PATENT DOCUMENTS

| DE | 102014001473 A1 | 8/2015 | | |
|---|---|---|---|---|
| GB | 2392406 A | * | 3/2004 | ............. B21D 28/34 |
| WO | WO-2017190200 A1 | * | 11/2017 | ............ F16B 37/042 |

OTHER PUBLICATIONS

FineWoodworking; Cam clamp is another great way to hold long workpieces; Jan. 9, 2024; https://www.finewoodworking.com/2022/12/21/cam-clamp-is-another-great-way-to-hold-long-workpieces; pp. 1-4; Newton, CO.

Accu-Slice; Offset Cam Clamping System; Jan. 9, 2024; http://www.accu-slice.com/store/p53/offset-cam-clamp.html; pp. 1-4; Ringoes, NJ.

Etsy; Flying Saucer Hold-dow/cam Clamps for CNC Workholding; https://www.etsy.com/fi-en/listing/1264500720/flying-saucer-hold-downcam-clamps-for; pp. 1-14; Brooklyn, NY.

Grizzly; Shop Fox D3347—Cam Clamp for T-Slots; Jan. 10, 2024; https://www.grizzly.com/products/shop-fox-cam-clamp-for-t-slots/d3347; pp. 1-2; Bellingham, WA.

* cited by examiner

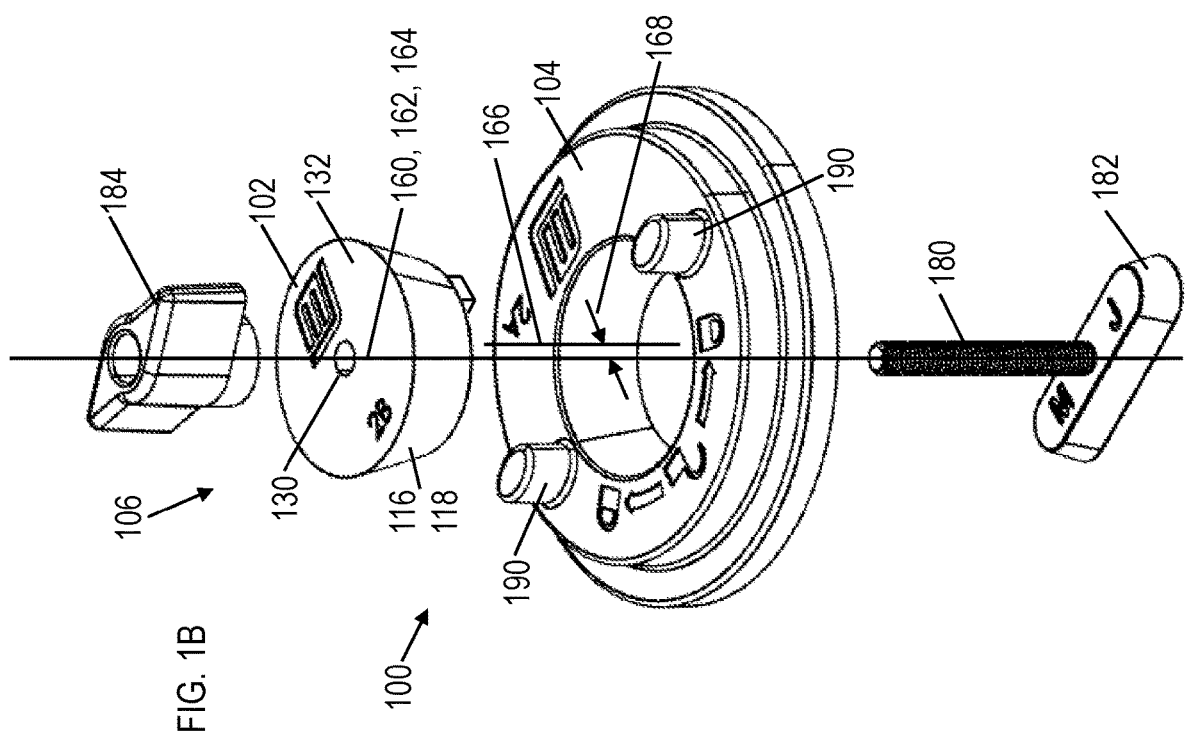
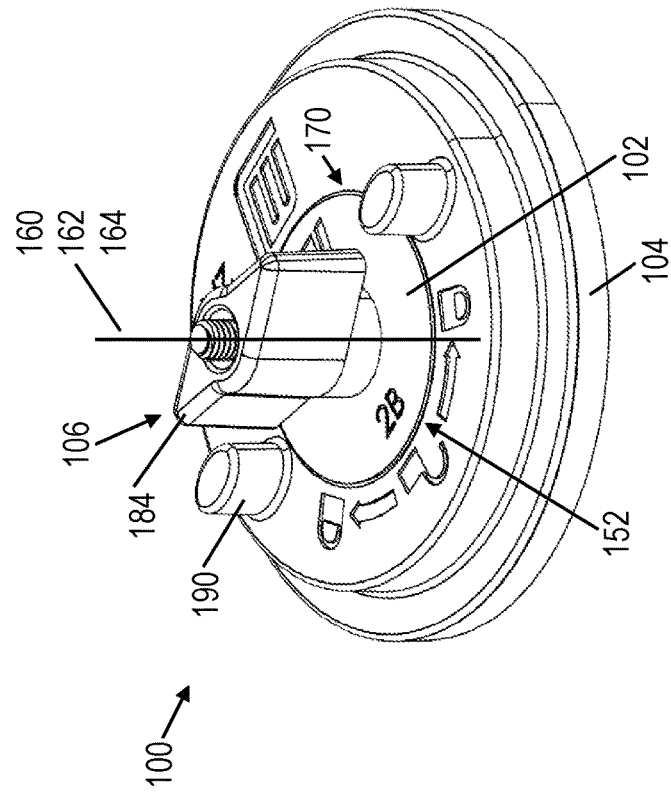
FIG. 1B
FIG. 1A

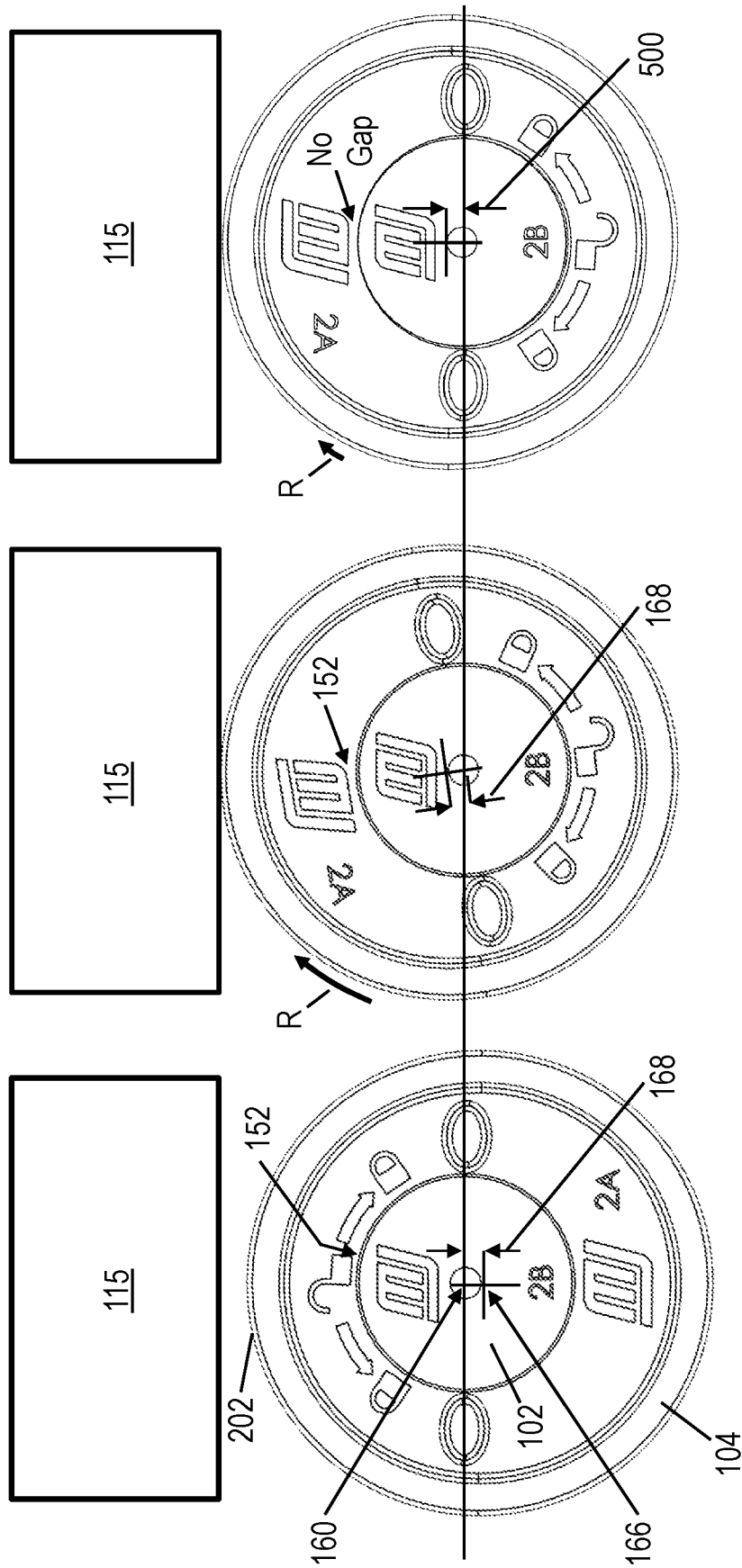

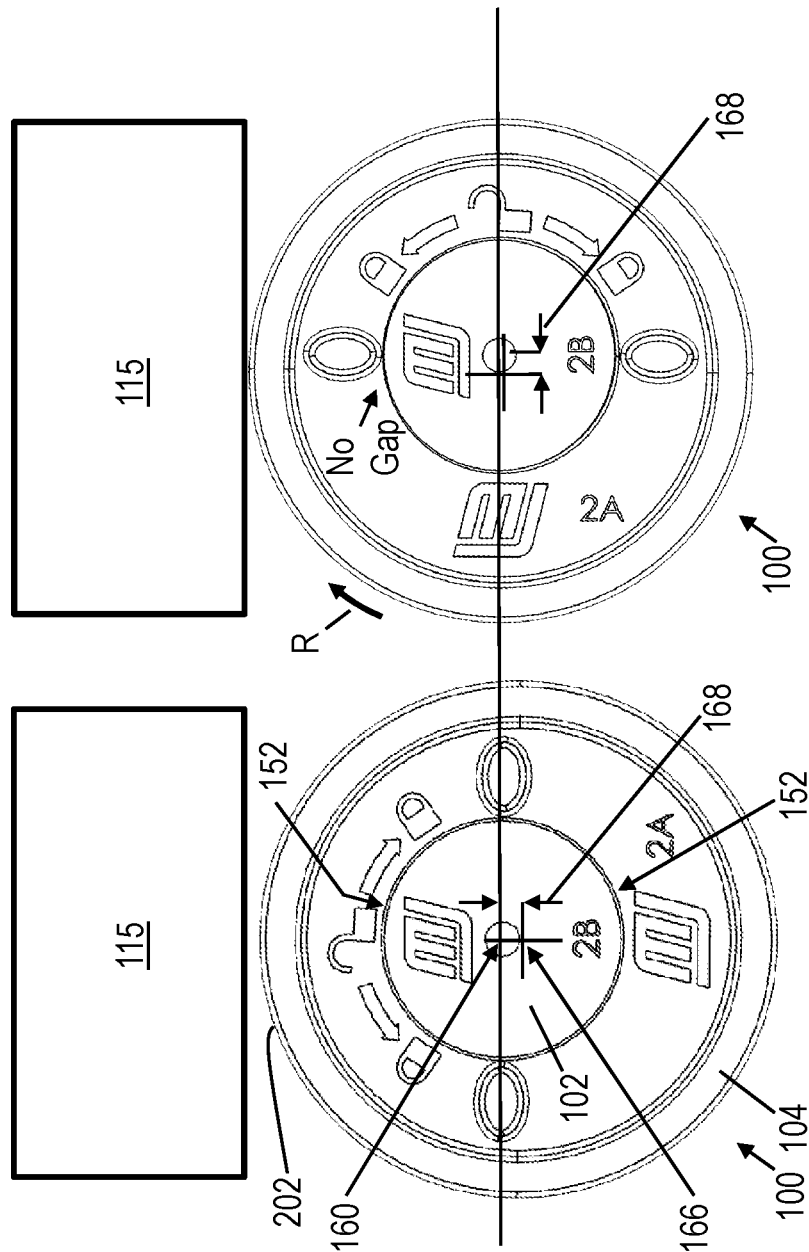

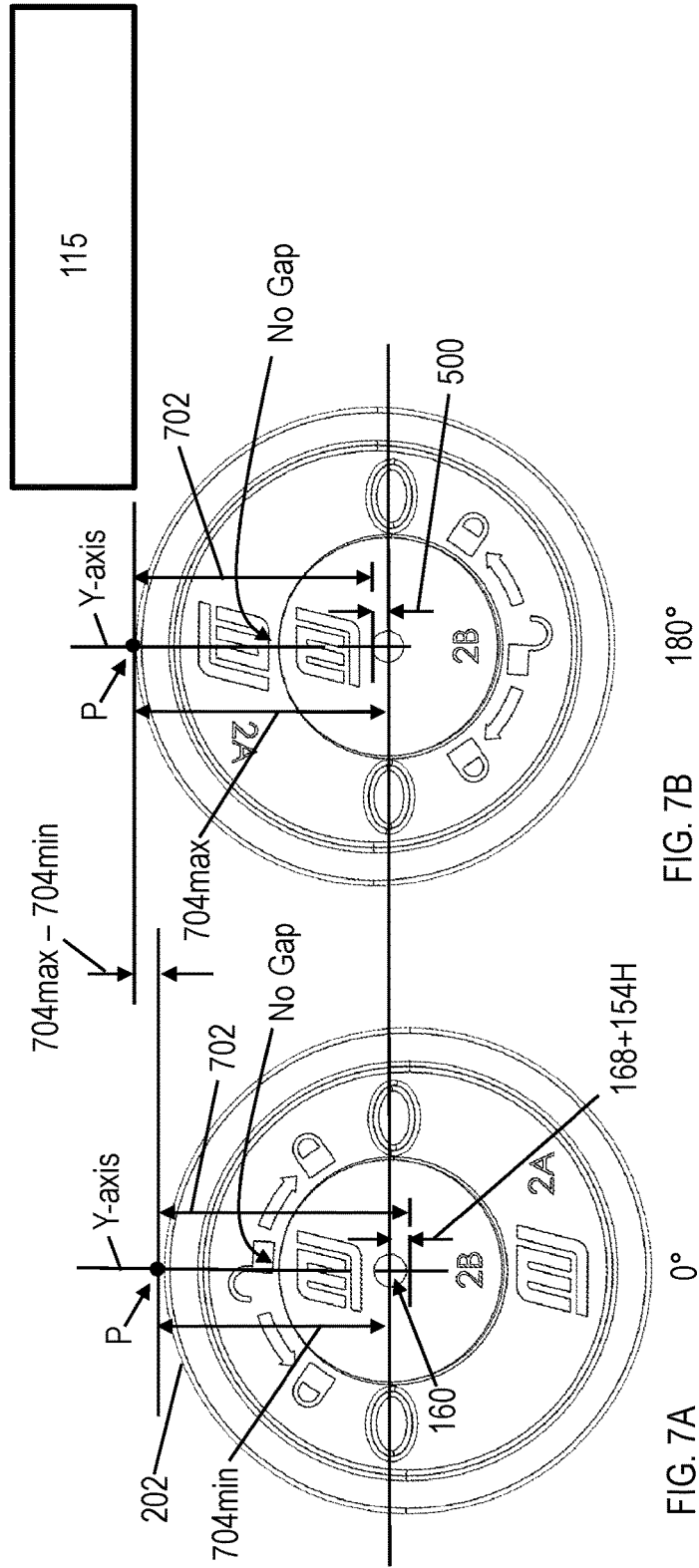
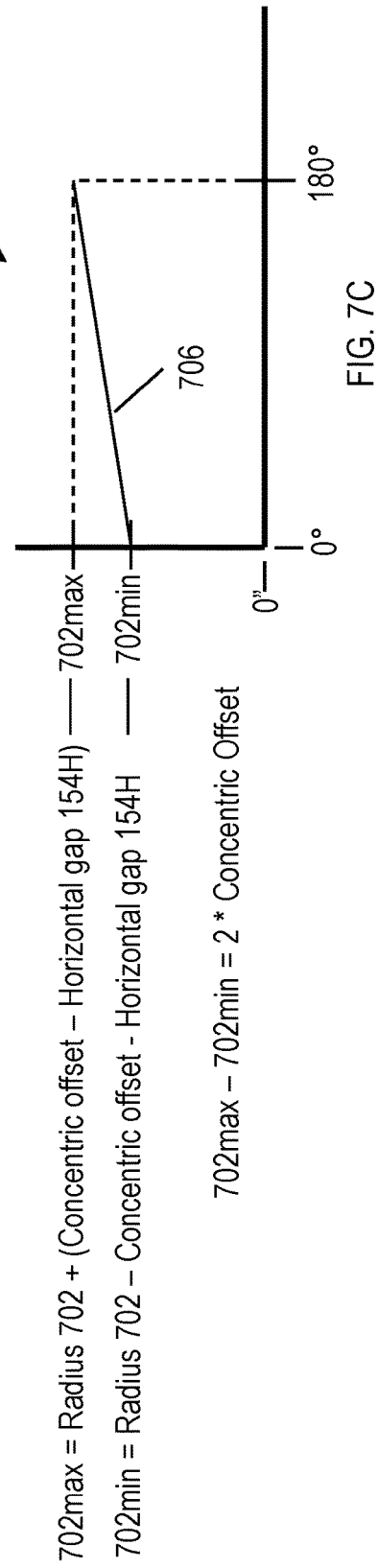
FIG. 7A  FIG. 7B  FIG. 7C
702max = Radius 702 + (Concentric offset − Horizontal gap 154H)
702min = Radius 702 − Concentric offset - Horizontal gap 154H
702max − 702min = 2 * Concentric Offset

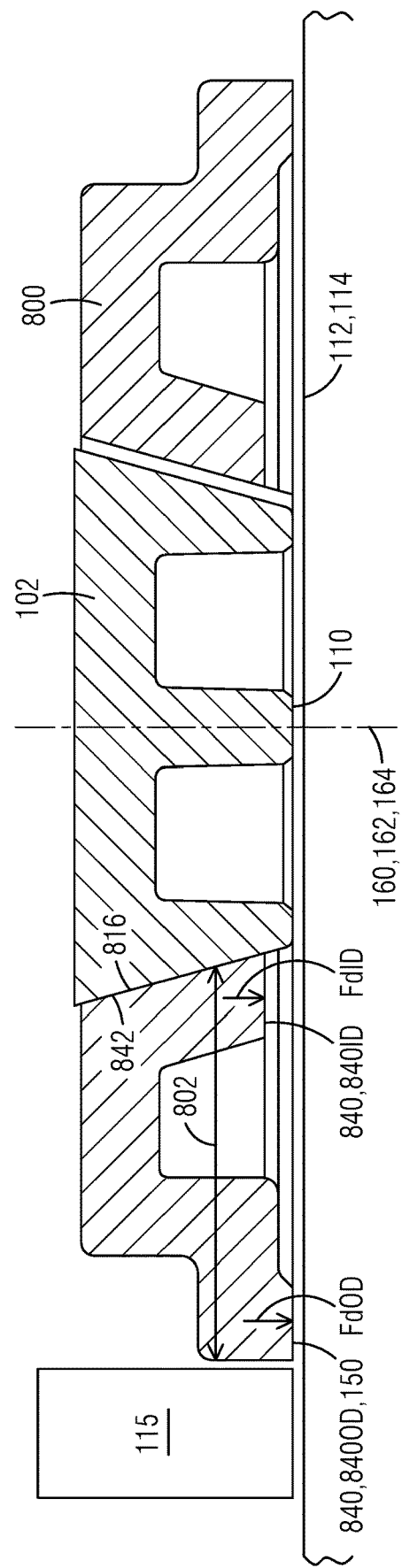

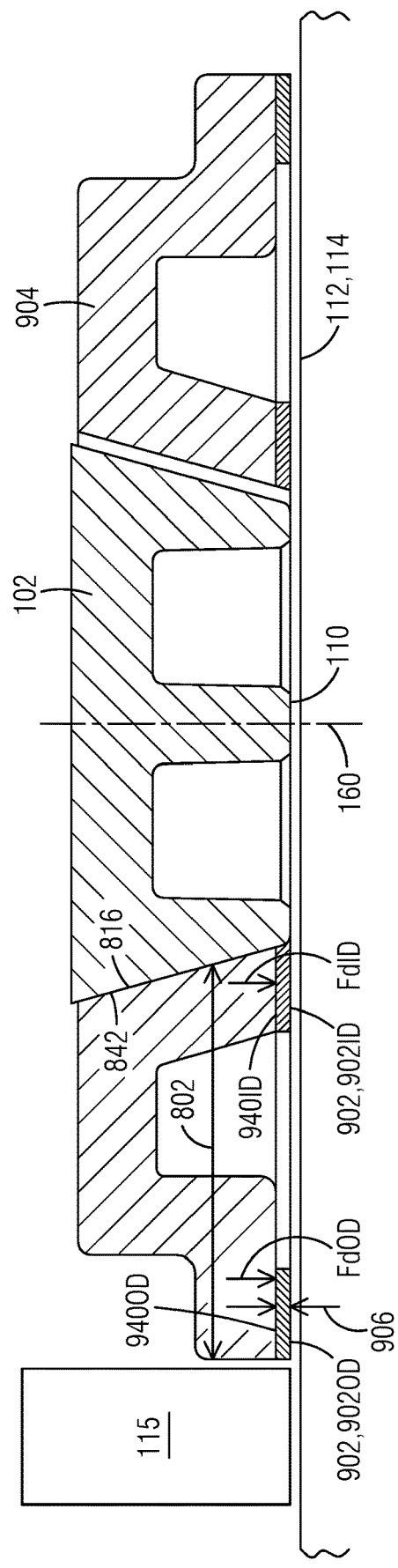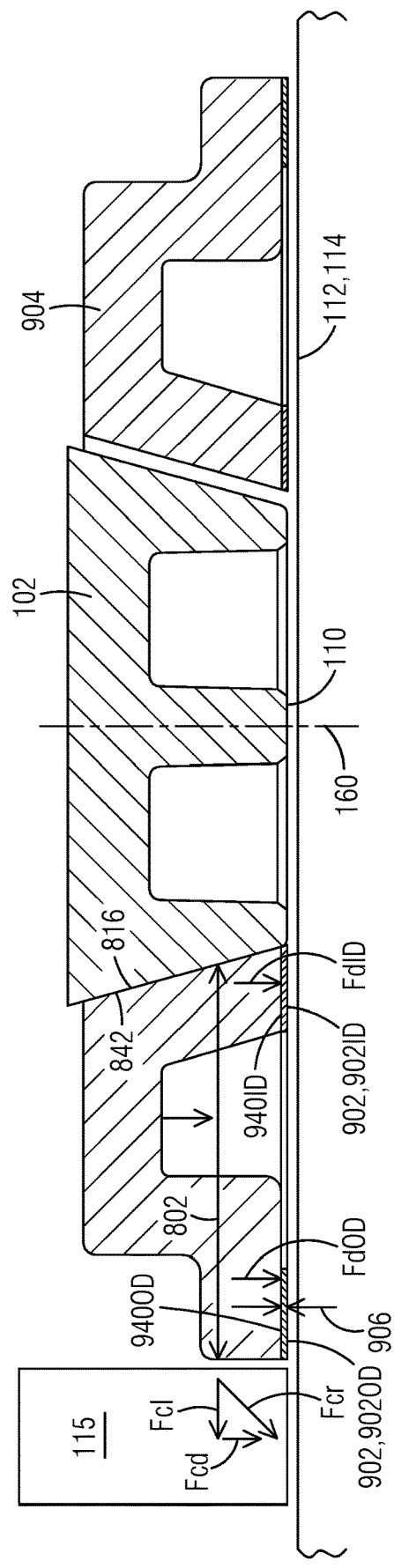

US 12,078,197 B1

CAM ACTION CLAMP

FIELD OF THE INVENTION

The invention relates to an eccentric cam clamp.

BRIEF DESCRIPTION OF THE DRAWINGS

The invention is explained in the following description in view of the drawings that show:

FIG. 1A is a perspective view of an example embodiment of an eccentric cam clamp disclosed herein.

FIG. 1B is an exploded view of the eccentric cam clamp of FIG. 1A.

FIG. 5A to FIG. 5C are top views showing the eccentric clamp disk of the eccentric cam clamp of FIG. 1A moving through a progression from a minimally displaced configuration to a fully displaced configuration relative to the workpiece.

FIG. 6A to FIG. 6B are top views showing the eccentric clamp disk of the eccentric cam clamp of FIG. 1A moving through a progression from the minimally displaced configuration to a partially displaced configuration relative to the workpiece.

FIG. 7A to FIG. 7B are top views showing the eccentric clamp disk of the eccentric cam clamp of FIG. 1A moving through a progression from a minimally displaced configuration to the fully displaced configuration relative to the workpiece.

FIG. 7C is a cam displacement chart for the eccentric clamp disk of FIG. 7A.

FIG. 8 is a sectional view of an alternate example embodiment of an eccentric clamp disk.

FIG. 9A and FIG. 9B are sectional views showing an alternate example embodiment of the eccentric clamp disk progressing through a clamping operation.

DETAILED DESCRIPTION OF THE INVENTION

The present inventors have created a unique and innovative eccentric cam clamp suitable for clamping a workpiece on a worktable. The eccentric cam clamp disclosed herein can be secured in a slot in an infinite number of positions relative to a workpiece. The clamping action is simple and ensures the workpiece is also held down on the worktable while being clamped laterally.

Figure 2A:
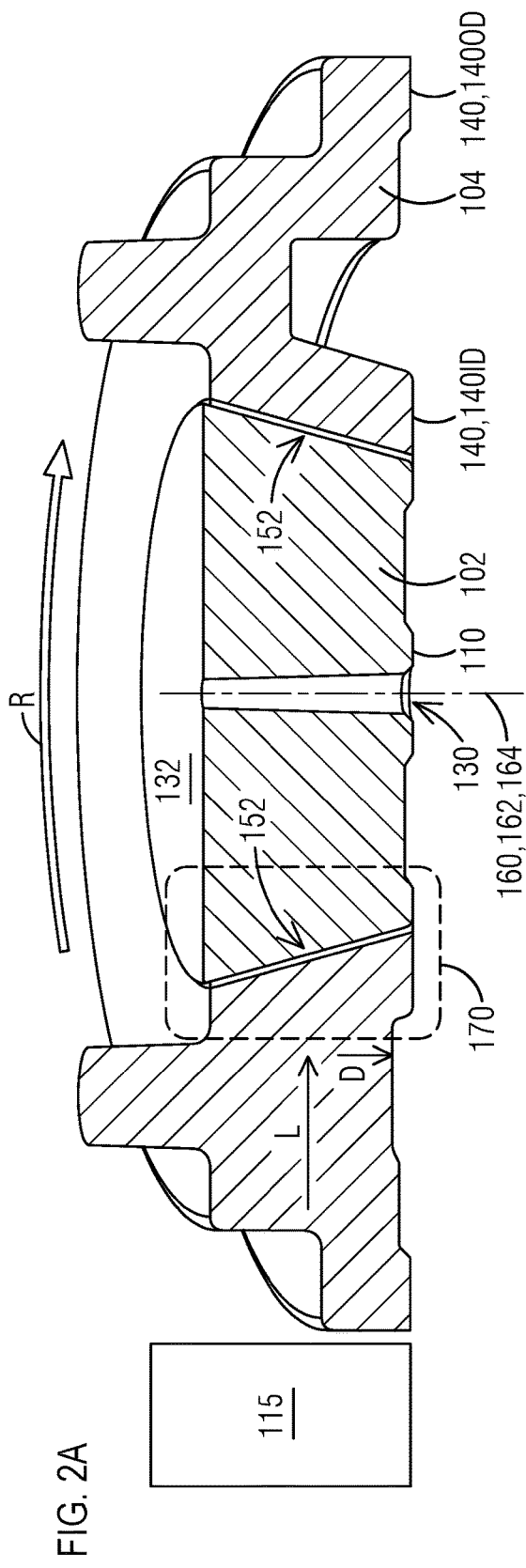
FIG. 2A is a sectional view of the eccentric cam clamp of FIG. 1A.
Figure 2C:
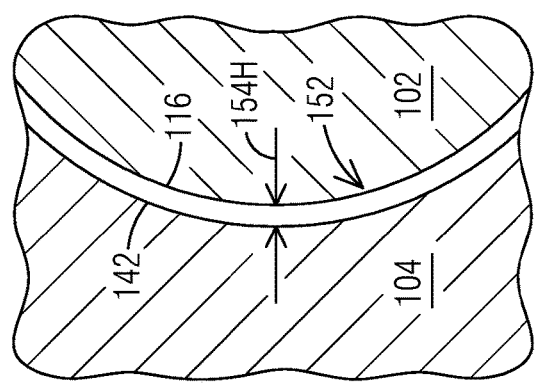
FIG. 2C is a sectional view along line C-C of FIG. 2B.
Figure 2B:
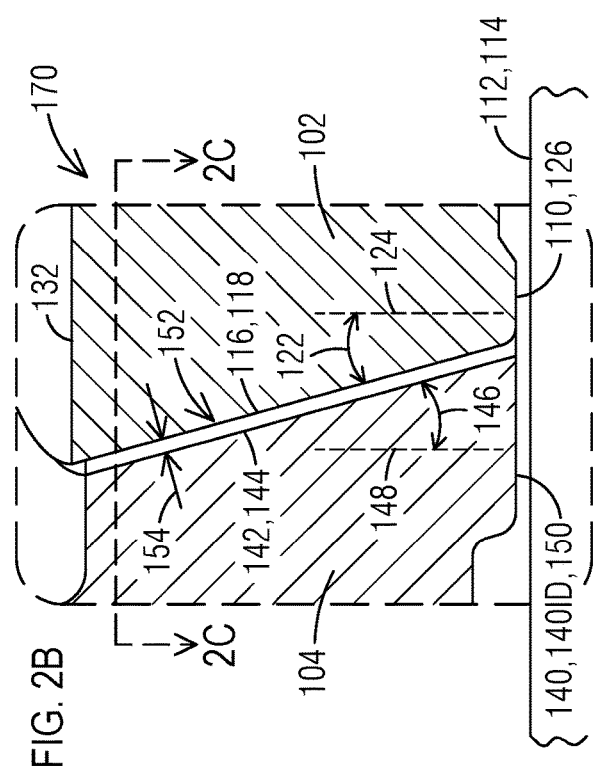
FIG. 2B is a close-up of the sectional view of FIG. 2A.

FIG. 1A and FIG. 1B show an example embodiment of an eccentric cam clamp 100 disclosed herein. FIG. 2A to 2C are sectional views showing various features of the eccentric cam clamp 100 of FIG. 1A.

The eccentric cam clamp 100 includes an example embodiment of a hub 102, an example embodiment of an eccentric clamp disk 104, and an example embodiment of a securing mechanism 106.

The hub 102 includes a hub bottom 110 configured to abut and be secured to a flat surface 112 of a worktable 114 by the securing mechanism 106. The hub bottom 110 may include an optional anti-rotation feature 111 to reduce the chances that the hub 102 rotates. The anti-rotation feature 111 may be a protrusion configured to extend downward into a slot and abut a sidewall of the slot and thereby act as a positive stop to united rotation. Alternately, or in addition, the anti-rotation feature 111 may be one or more friction enhancing feature like dimples and/or ribs that engage the flat surface 112, and/or may be one or more friction enhancing coatings and/or one or more friction enhancing materials. The hub 102 further includes an outer perimeter 116 that includes a taper 118. The taper 118 tapers radially inward (narrows) as the outer perimeter 116 gets closer to the hub bottom 110. In an example embodiment, a hub taper angle 122 ranges from ten degrees (10°) to twenty degrees (20°) with a normal line 124 that is normal to a hub bottom plane 126 defined by the hub bottom 110. In an example embodiment, the hub taper angle 122 is fourteen degrees (14°). In an example embodiment, the outer perimeter 116 and therefore the hub 102 define an upside down frustoconical shape.

The hub 102 further includes a securing mechanism hole 130 and a hub upper surface 132 configured to cooperate with the securing mechanism 106 to secure the hub 102 to the flat surface 112.

The eccentric clamp disk 104 includes an eccentric clamp disk bottom 140 configured to abut the flat surface 112. The eccentric clamp disk 104 further includes an inner perimeter 142 that includes a taper 144. The taper 144 tapers radially inward (narrows) as the inner perimeter 142 gets closer to the eccentric clamp disk bottom 140. In an example embodiment, an eccentric clamp disk taper angle 146 ranges from ten degrees (10°) to twenty degrees (20°) with a normal line 148 that is normal to an eccentric clamp disk bottom plane 150 defined by the eccentric clamp disk bottom 140. The hub bottom 110 and the eccentric clamp disk bottom 140 both rest on the flat surface 112 during normal operation. In the example embodiment shown, the eccentric clamp disk bottom 140 includes a clamp disk bottom inner diameter 140ID and a clamp disk bottom outer diameter 140 OD that both lie in the eccentric clamp disk bottom plane 150. However, there may be only one eccentric clamp disk bottom portion and it may occupy all or any portion of the radial extent of the eccentric clamp disk 104. In an example embodiment, the eccentric clamp disk taper angle 146 is fourteen degrees (14°). In an example embodiment, the inner perimeter 142 and therefore the eccentric clamp disk 104 define an upside down frustoconical shape.

The eccentric clamp disk taper angle 146 and the hub taper angle 122 may be the same as each other. In an example embodiment, the outer perimeter 116 of the hub 102 and the inner perimeter 142 of the eccentric clamp disk 104 are sized and shaped so they match each other and are therefore complimentary with each other. In such an example embodiment, the outer perimeter 116 of the hub 102 nests inside the inner perimeter 142 of the eccentric clamp disk 104. In an example embodiment, when the hub bottom plane 126 and the eccentric clamp disk bottom plane 150 are in a same plane, when the outer perimeter 116 of the hub 102 and the inner perimeter 142 of the eccentric clamp disk 104 are sized and shaped to be complimentary, and when the inner perimeter 142 of the eccentric clamp disk 104 is concentric with the outer perimeter 116 of the hub 102, an optional gap 152 may be formed there between. When the outer perimeter 116 of the hub 102 and the inner perimeter 142 of the eccentric clamp disk 104 define an upside-down frustoconical shape, the gap 152 itself likewise defines an upside-down frustoconical shape.

A magnitude of the gap 152 may be constant throughout the gap 152, though this is not necessary.

A closest dimension 154 between the outer perimeter 116 of the hub 102 and the inner perimeter 142 of the eccentric clamp disk 104 may be as little as 0.001" to achieve a slip fit.

In the example embodiment shown, a hub center 160 of the hub 102, an inner perimeter center 162, and an outer perimeter center 164 are concentric with each other. Also, the eccentric clamp disk 104 is circular and has an eccentric clamp disk center 166 that is offset from the hub center 160 by a concentric offset 168. This concentric offset 168 creates the eccentric action of the eccentric cam clamp 100.

When the hub 102 is fixed to the flat surface 112 it is nested in the eccentric clamp disk 104 and the interlocking slip fit relationship exists between the hub 102 and the eccentric clamp disk 104. The interlocking slip fit relationship enables infinite rotation of the eccentric clamp disk 104 about the hub center 160 when the hub 102 is held in a fixed position relative to the flat surface 112.

A slip fit as used herein refers to a fit between the hub 102 and the eccentric clamp disk 104 that allows for relative movement therebetween via fingertip force alone. In an example embodiment, a slip fit is created when a minimum distance of at least 0.001 inches is present between the relatively slipping parts.

The interlocking slip fit optionally includes a geometric interlock 170 configured so that when the eccentric clamp disk 104 is pushed laterally into contact with the hub 102, as indicated by arrow L, the geometric interlock 170 urges the eccentric clamp disk 104 downward onto the flat surface as indicated by arrow D. This lateral push may result when the eccentric clamp disk 104 is rotated into position between the hub 102 and a workpiece 115 as indicated by arrow R, and thereby compressed between the workpiece 115 and the hub 102. The geometric interlock 170 optionally limits movement of the eccentric clamp disk 104 (vertically) away from the flat surface 112. This limitation to the vertical movement traps the eccentric clamp disk 104 between the flat surface 112 and the hub 102 so that the eccentric clamp disk 104 cannot be lifted off the hub 102.

The geometric interlock 170 is achieved in this example embodiment by the taper 118 of the outer perimeter 116 of the hub 102 cooperating with the taper 144 of the inner perimeter 142 of the eccentric clamp disk 104. In alternate example embodiment, the inner perimeter 142 of the eccentric clamp disk 104 may have less taper or no taper, but the outer perimeter 116 of the hub 102 may be tapered and will still urge the inner perimeter 142 of the eccentric clamp disk 104 downward in response to the eccentric clamp disk 104 being pushed laterally as indicated by arrow L. In a nonlimiting example and with reference to the view of FIG. 2B, the inner perimeter 142 of the eccentric clamp disk 104 may have a convex profile having a peak that alone contacts the outer perimeter 116 of the hub 102. The peak would "ride" down the outer perimeter 116 of the hub 102 downward in response to the eccentric clamp disk 104 being pushed laterally as indicated by arrow L.

In yet another alternate example embodiment, the outer perimeter 116 of the hub 102 may have less taper or no taper, but the inner perimeter 142 of the eccentric clamp disk 104 will still urge the inner perimeter 142 of the eccentric clamp disk 104 downward in response to the eccentric clamp disk 104 being pushed laterally as indicated by arrow L. In a nonlimiting example and with reference to the view of FIG. 2B, outer perimeter 116 of the hub 102 may have a convex profile having a peak that alone contacts the inner perimeter 142 of the eccentric clamp disk 104. The taper 144 of the inner perimeter 142 would "ride" down the peak of the hub 102 in response to the eccentric clamp disk 104 being pushed laterally as indicated by arrow L.

The securing mechanism 106 includes a securing mechanism threaded rod 180 that extends through a securing mechanism hole 130 in the hub 102. A securing mechanism dovetail nut 182 fits into a dovetail slot in the worktable 114 and a securing mechanism tightening nut 184 abuts the hub upper surface 132. Tightening the securing mechanism tightening nut 184 when the securing mechanism dovetail nut 182 is in the dovetail slot fixes the hub 102 to the worktable 114 so that the hub 102 does not move relative to the worktable 114.

The eccentric cam clamp 100 may further include grip tabs 190 disposed opposite each other about the hub center 160 and used to facilitate rotation of the eccentric clamp disk 104 around the hub.

Figure 3:
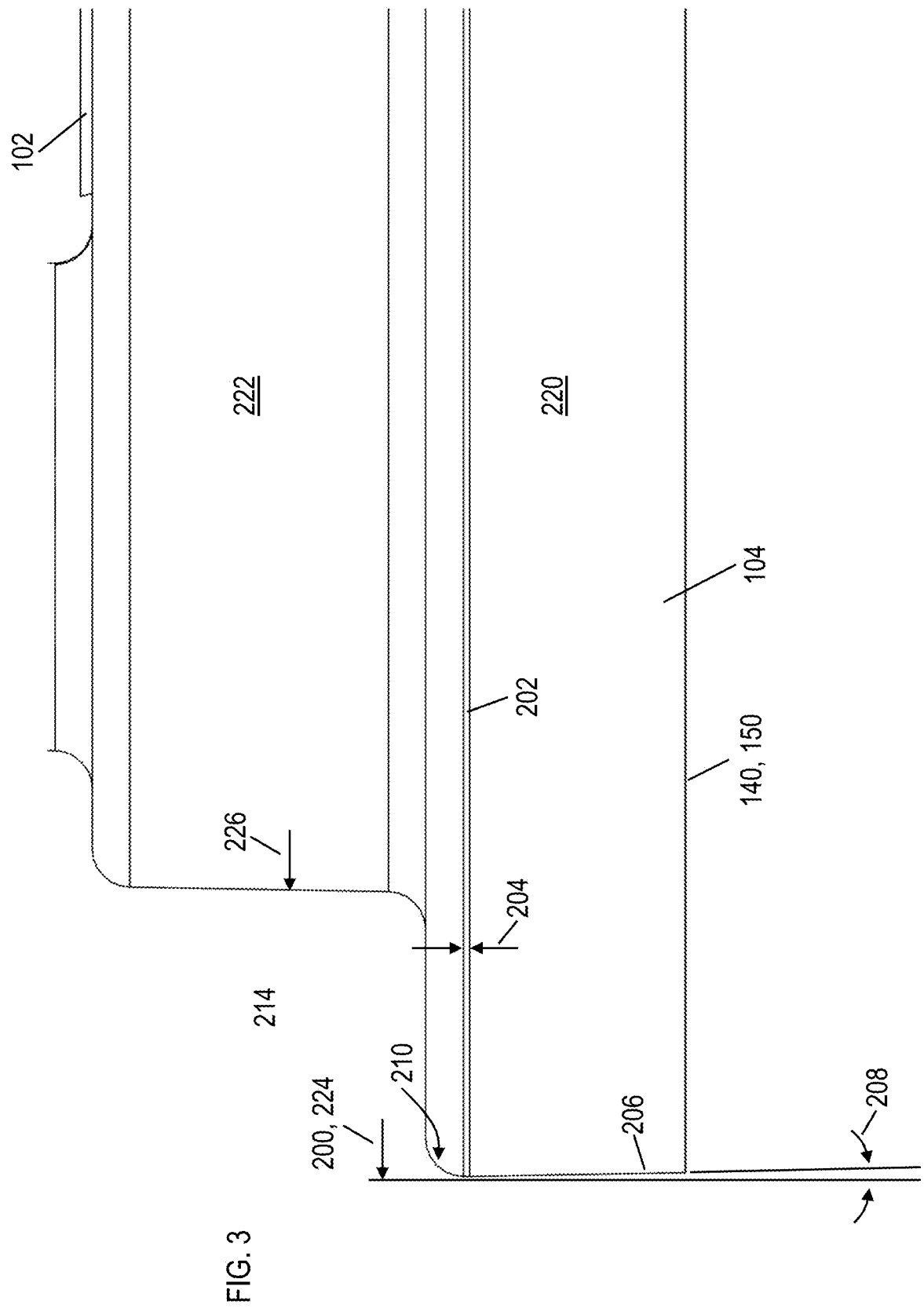
FIG. 3 is a close-up side view of the eccentric cam clamp of FIG. 1A.

FIG. 3 is a close-up side view of the eccentric cam clamp 100 of FIG. 1A. At an outermost diameter 200 of the eccentric clamp disk 104 a contact ridge 202 if formed having a width 204. The contact ridge 202 makes initial contact with the workpiece 115 during the clamping action. Below the contact ridge 202 a raked face 206 tapers radially inward toward the eccentric clamp disk bottom 140 at a rake angle 208. Above the contact ridge 202 a radius 210 causes the eccentric clamp disk 104 to recede radially from the contact ridge 202. A profile of the contact ridge 202 may be flat and disposed perpendicular to the eccentric clamp disk bottom plane 150. Alternately, it may be convex with a peak of the convex shape being the outermost diameter 200 of the eccentric clamp disk 104.

The eccentric cam clamp 100 further includes a radially inward relief step 214 disposed above the contact ridge 202. The radially inward relief step 214 provides, for example, a relief for CNC machine tools that may travel past an edge of a clamped workpiece being machined and over the eccentric cam clamp 100.

In an example embodiment, the eccentric cam clamp 100 includes a lower body portion 220 comprising the contact ridge 202 and an upper body portion 222 disposed above the lower body portion 220. A lower body portion diameter 224 of the lower body portion 220 is larger than an upper body portion diameter 226 of the upper body portion 222. In an example embodiment, the lower body portion diameter 224 is the outermost diameter 200. This geometry may define the radially inward relief step 214.

Figure 4:
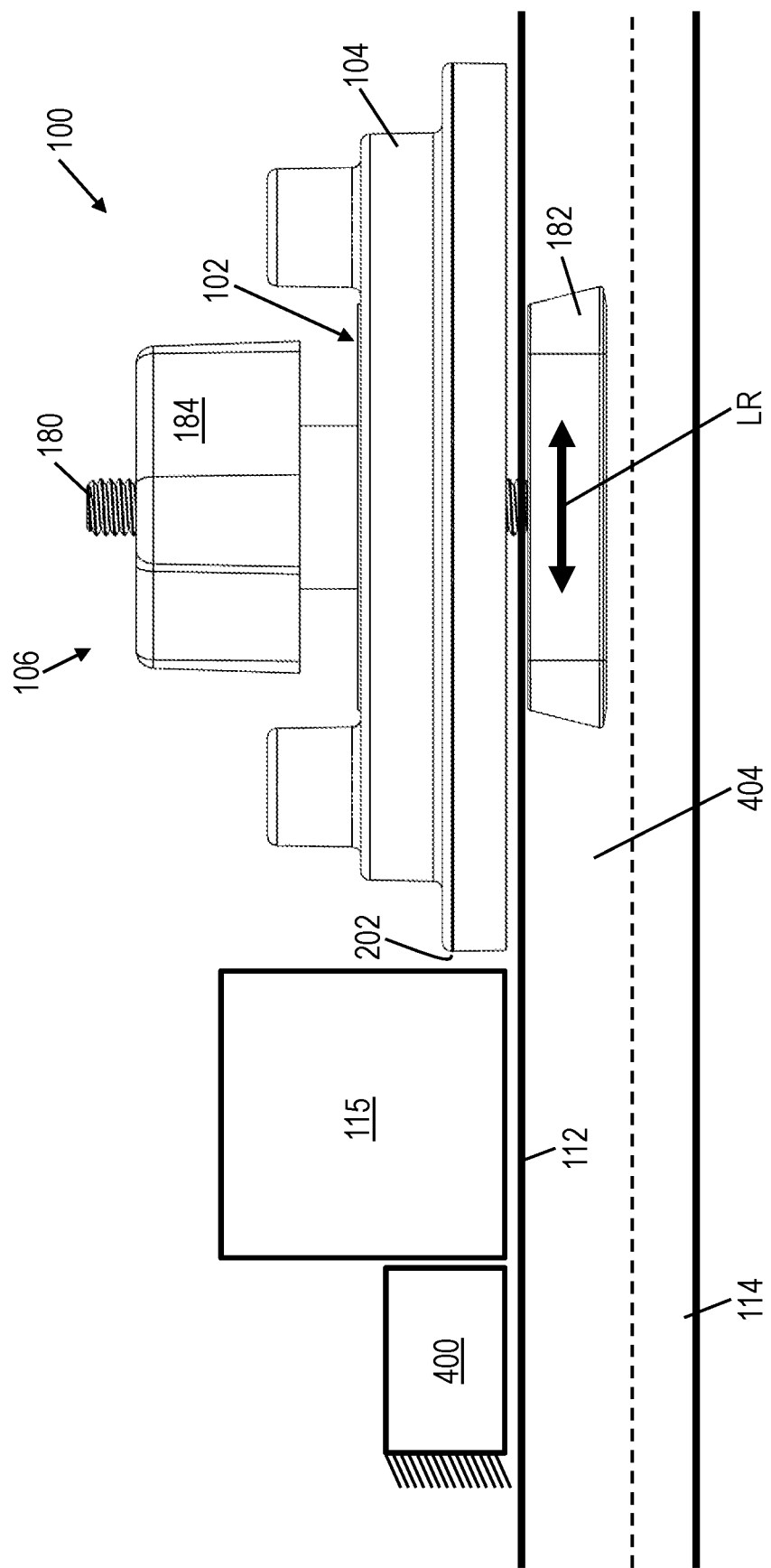
FIG. 4 is a side view showing the eccentric cam clamp of FIG. 1A adjacent a workpiece.

FIG. 4 is a side view showing the eccentric cam clamp 100 of FIG. 1A adjacent the workpiece 115. The workpiece 115 abuts a fixed element 400 that is held in a fixed position relative to the worktable 114. The worktable 114 includes a dovetail slot 404 recessed therein, running left/right as indicated by arrow LR, and into which the securing mechanism dovetail nut 182 has been placed. The securing mechanism tightening nut 184 has been tightened to snug the securing mechanism 106, which fixed the hub 102 in position relative to the worktable 114. The left/right orientation of the dovetail slot 404 allows for an infinite number of positions at which the eccentric cam clamp 100 can be secured relative to the workpiece 115. To clamp the workpiece 115, the eccentric clamp disk 104 is rotated until the eccentric nature of the eccentric clamp disk 104 brings the contact ridge 202 into contact with the workpiece 115. After the initial contact, the eccentric clamp disk 104 is further rotated until a desired amount of clamping force is achieved. Releasing the workpiece 115 is accomplished by simply rotating the eccentric clamp disk 104 in the opposite direction until the workpiece 115 is released.

FIG. 5A to FIG. 5C are top views showing the eccentric clamp disk 104 of the eccentric cam clamp 100 of FIG. 1A moving through a progression relative to the workpiece 115.

FIG. 5A shows a concentric, minimally displaced configuration. The concentric configuration is present when the inner perimeter 142 of the eccentric clamp disk 104 is concentric with the outer perimeter 116 of the hub 102, which creates the gap 152 which is uniform. The concentric offset 168 is present when the gap 152 exists and is uniform between the hub 102 and the eccentric clamp disk 104. In FIG. 5A, the concentric offset 168 in FIG. 5A is disposed on an opposite side of the hub center 160. Hence, the contact ridge 202 is at a maximum distance from the workpiece.

FIG. 5B shows a concentric, displaced configuration at initial contact with the workpiece 115. The eccentric clamp disk 104 has been rotated clockwise as indicated by arrow R by an amount approaching but not yet reaching a half turn. Here, the contact ridge 202 makes initial contact with the workpiece 115.

FIG. 5C shows a non-concentric, fully displaced configuration. The non-concentric configuration is present when the inner perimeter 142 of the eccentric clamp disk 104 is not concentric with the outer perimeter 116 of the hub 102. As referenced herein, in the non-concentric configuration the eccentric clamp disk 100 contacts the hub 102. This eliminates the gap at the point of contact there between and doubles the gap on an opposite side. The eccentric clamp disk 104 has been rotated clockwise as indicated by arrow R by an additional amount to complete the half turn. This places the eccentric clamp disk center 166 directly between the hub center 160 and the workpiece 115, which is a true lock configuration. Since the contact ridge 202 was already in contact with the workpiece 115 at the initial contact as shown in FIG. 5B, the eccentricity of the eccentric clamp disk 104 closed the gap 152 as the eccentric clamp disk was further turned. As a result, the eccentric clamp disk 104 is no longer concentric with the hub 102. A new, true lock offset 500 exists in this configuration. The true lock offset is the concentric offset 168 minus the horizontal distance 154H between the outer perimeter 116 of the hub 102 and the inner perimeter 142 of the eccentric clamp disk 104.

In FIG. 5A to FIG. 5C the eccentric cam clamp 100 was placed as far as possible from the workpiece to show the full range of clamping positions possible. Alternately, the eccentric cam clamp 100 can initially be placed closer than is shown in FIG. 5A. An example of this can be seen in FIG. 6A to FIG. 6B.

FIG. 6A to FIG. 6B are top views showing the eccentric clamp disk 104 of the eccentric cam clamp of FIG. 1A moving through a progression from the minimally displaced configuration to a partially displaced configuration relative to the workpiece 115.

As can be seen in FIG. 6A, the eccentric cam clamp 100 was initially placed closer to the workpiece than was the eccentric cam clamp 100 of FIG. 5A. Because it was closer to the workpiece 115, the eccentric cam clamp 100 only needed to be turned ninety degrees (90°) to reach the clamped configuration shown in FIG. 6B. The closer placement caused the contact ridge 202 to make initial contact before the eccentric clamp disk 104 reached ninety degrees (90°). Further rotation then closed the gap 152 until a desired amount of clamp force was reached.

During a clamping operation, once the gap 152 is closed, the clamping force will increase with progressively more rotation of the eccentric clamp disk 104. Successfully clamping can be achieved without reaching the true locked configuration of FIG. 5C. Indeed, rarely will the true locked configuration be reached in actual usage. In most cases, the eccentric cam clamp 100 will provide sufficient clamping in positions ranging from any configuration where the eccentric clamp disk 104 fills the space between the hub 102 and the workpiece 115 to the true locked configuration.

FIG. 7A to FIG. 7B are top views showing the eccentric clamp disk 104 of the eccentric cam clamp 100 of FIG. 1A moving through a progression from a minimally displaced configuration that is similar but not the same as that of FIG. 5A to the fully displaced configuration relative to a workpiece that is the same as that of FIG. 5C.

FIG. 7C is a cam displacement chart 700 for the eccentric clamp disk 104 of the eccentric cam clamp 100. The cam displacement chart 700 reflects the radial displacement of point P relative to the hub center 160 as the eccentric clamp disk 104 rotates from zero degrees (0°) as shown in FIG. 7A to 180° as shown in FIG. 7B. Point P is where the contact ridge 202 of the eccentric clamp disk 104 intersects the y-axis throughout the rotation of the eccentric clamp disk 104.

When the inner perimeter 142 of the eccentric clamp disk 104 is concentric with the hub 102, the horizontal distance 154H of the gap 152 is counted in the concentric offset 168 (see FIG. 5A). The cam displacement chart 700 is intended to reflect the eccentricity of the eccentric clamp disk 104 alone. Since the gap 152 directly between the hub center 160 and the workpiece 115 is not present in the true locked configuration of FIG. 7B, the horizontal distance 154H of the gap 152 has been removed in FIG. 7A. As such, any radial displacement of point P between FIG. 7A and FIG. 7B is due solely to the eccentric clamp disk 104.

As shown in FIG. 7A, the eccentric clamp disk 104 has a radius 702 along the Y-axis from the eccentric clamp disk center 166 to the contact ridge 202. The eccentric clamp disk center 166 is negatively offset along the Y-axis by the concentric offset 168. The eccentric clamp disk center 166 is further negatively offset along the Y-axis when the eccentric clamp disk 104 is lowered to eliminate the gap 152 directly between the hub center 160 and the workpiece 115. A distance 704 min along the Y-axis in FIG. 7A from the hub center 160 to the point P can therefore be expressed as:

Distance 704 min=radius 702−concentric offset 168−horizontal distance 154H.

As shown in FIG. 7B, the eccentric clamp disk 104 has a radius 702 along the Y-axis from the eccentric clamp disk center 166 to the contact ridge 202. The eccentric clamp disk center 166 is positively offset along the Y-axis by the concentric offset 168. The eccentric clamp disk center 166 is negatively offset along the Y-axis when the eccentric clamp disk 104 is lowered to eliminate the gap 152 directly between the hub center 160 and the workpiece 115. A distance 704 max along the Y-axis in FIG. 7B from the hub center 160 to the point P can therefore be expressed as:

Distance 704max=radius702+(concentric offset 168−horizontal distance 154H).

The radial displacement can be expressed as:

Distance 704max−Distance 704 min

This reduces to:

2*concentric offset 168

In an example embodiment, the radius 702 of the eccentric clamp disk 104 is 1.5", the concentric offset is 3/16", and the horizontal distance 154H is 0.003". The radial displacement then equates to 2*3/16=3/8 for a half turn. As can be seen in FIG. 7C, a radial displacement curve 706 represents the radial displacement throughout the 180° of rotation. This radial displacement curve 706 is linear. However, the radial displacement curve 706 need not be linear. It could be stepped, or asymptotic (approaching horizontal with increased turning), or the like. Also, maximum displacement magnitudes greater than ⅜" or less than ⅜" can be used. In example embodiments, the maximum displacement magnitude can range from ¼" to ½" for the half turn.

FIG. 8 is a sectional view of an alternate example embodiment of an eccentric clamp disk 800. The eccentric clamp disk bottom inner diameter 140ID and the eccentric clamp disk bottom outer diameter 140OD of the eccentric clamp disk 104 of FIG. 1A both lie in the eccentric clamp disk bottom plane 150. In contrast, in this example embodiment, eccentric clamp disk bottom outer diameter 840OD defines the eccentric clamp disk bottom plane 150. The eccentric clamp disk bottom inner diameter 840ID is raised relative to the eccentric clamp disk bottom plane 150.

During a clamping operation, as the eccentric clamp disk 800 is rotated into a clamping position it is compressed between the workpiece 115 and the hub 102. This creates a radially oriented compressive force 802 in the eccentric clamp disk 800. Further turning of the eccentric clamp disk increases the magnitude of the compressive force 802. The compressive force 802 presses the inner perimeter 842 of the eccentric clamp disk 804 onto the outer perimeter 816 of the hub 102. The interaction of the tapers generates a downward force FdID on the eccentric clamp disk bottom inner diameter 840ID and downward force FdOD on the eccentric clamp disk bottom outer diameter 840OD.

This downward force FdID urges the eccentric clamp disk bottom inner diameter 140ID downward relative to the eccentric clamp disk bottom outer diameter 840OD. This is possible because the eccentric clamp disk bottom inner diameter 840ID is raised relative to the eccentric clamp disk bottom plane 150. The eccentric clamp disk bottom outer diameter 840OD would move downward with the eccentric clamp disk bottom inner diameter 140ID in response to the downward force FdOD, but the eccentric clamp disk bottom outer diameter 840OD is constrained by the worktable 114 and therefore cannot move downward. This results in a downward flex of the eccentric clamp disk bottom inner diameter 140ID relative to the eccentric clamp disk bottom outer diameter 840OD. A magnitude of the flex corresponds to the magnitude of the compressive force 802 and the angles of the tapers. This downward flex of the eccentric clamp disk bottom inner diameter 140ID pre-flexes the eccentric clamping disk so that the eccentric clamp disk bottom outer diameter 840OD is less likely to lift off the worktable 114 as the workpiece 115 is machined.

FIG. 9A and FIG. 9B are sectional views showing an alternate example embodiment of an eccentric clamp disk 900 progressing through a clamping operation. In this example embodiment, the eccentric clamp disk bottom 140 is defined by one or more resilient elements 902. In the example embodiment shown, the eccentric clamp disk 900 includes both an outer resilient element 902OD and an inner resilient element 902ID. In other example embodiments, there may be only one of the outer resilient element 902OD and the inner resilient element 902ID. Suitable resilient elements include compressible material adhered onto the eccentric clamp disk bottom 140 as a layer, discrete springs secured to the bottom (which optionally can be replaced as they wear), and elements that are integral to the eccentric clamp disk 900 such as flexible and downward extending protrusions etc.

As the eccentric clamp disk 900 is further rotated about the hub center 160 from FIG. 9A to FIG. 9B, the compressive force 802 increases. This increases the downward force FdID and the downward force FdOD. Resilience of the inner resilient element 902ID and the outer resilient element 902OD allow them to yield to the forces FdID and FdOD applied by the eccentric clamp disk bottom inner diameter 940ID and the eccentric clamp disk bottom outer diameter 940OD. This, in turn, allows the eccentric clamp disk bottom inner diameter 940ID and the eccentric clamp disk bottom outer diameter 840OD to move downward relative to the hub and thereby approach the worktable 114. The yielding of the outer resilient element 902OD and an inner resilient element 902ID is indicated by a reduction in the thickness 906 of the outer resilient element 902OD and an inner resilient element 902ID from FIG. 9A to FIG. 9B.

The eccentric clamp disk 904 is in contact with the workpiece 115 as the eccentric clamp disk 904 is rotated and thereby compressed between the workpiece 115 and the hub 102. This squeezing creates a lateral clamping force Fcl on the workpiece 115. The eccentric clamp disk 904 is also in contact with the workpiece 115 as the eccentric clamp disk 904 lowers to the worktable 114. The downward movement creates a downward clamping force Fcd on the workpiece 115 that acts to hold the workpiece 115 down on the worktable 114. The lateral clamping force Fcl and the downward clamping force Fcd are components of a resulting clamping force Fcr that is angled laterally and downward. The eccentric clamp disk 904 thereby creates a clamping force that holds the workpiece 115 both laterally and down onto the worktable 114.

The eccentric cam clamp disclosed herein provides a simple and effective solution related to cam clamping and thereby represents an improvement in the art. While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:
   a hub comprising a hub center;
   a securing mechanism configured to fix the hub onto a flat surface; and
   an eccentric clamp disk;
   wherein when the hub is fixed to the flat surface and nested in the eccentric clamp disk an interlocking slip fit relationship exists between the hub and the eccentric clamp disk that enables infinite rotation of the eccentric clamp disk about the hub center and that comprises a geometric interlock configured so that when the eccentric clamp disk is pushed laterally into contact with the hub, the geometric interlock urges the eccentric clamp disk downward onto the flat surface.

2. The apparatus of claim 1,
   wherein the geometric interlock also limits movement of the eccentric clamp disk away from the flat surface.

3. The apparatus of claim 2,
   wherein the hub comprises a hub outer perimeter;
   wherein the eccentric clamp disk comprises a clamp disk inner perimeter inside which the hub is nested; and
   wherein at least one of the hub outer perimeter and the clamp disk inner perimeter comprises a taper that narrows toward the flat surface; and wherein the hub outer perimeter and the clamp disk inner perimeter create the interlocking slip fit relationship.

4. The apparatus of claim 3, wherein the hub outer perimeter and the clamp disk inner perimeter each comprises an upside-down frustoconical shape comprising a same taper angle.

5. The apparatus of claim 2, wherein the hub comprises a hub outer perimeter; wherein the eccentric clamp disk comprises a clamp disk inner perimeter; and wherein at least one of the hub outer perimeter and the clamp disk inner perimeter comprises an upside-down frustoconical shape that defines the taper.

6. The apparatus of claim 1, wherein the securing mechanism comprises:
an anchor nut configured to fit in a slot in the flat surface;
a threaded rod secured to the anchor nut and passing through the hub; and
a securing nut configured to cooperate with the threaded rod to clamp the hub onto the flat surface.

7. The apparatus of claim 1, wherein the eccentric clamp disk comprises an outer perimeter that defines a contact ridge and a raked face that tapers inward from the contact ridge toward the flat surface.

8. The apparatus of claim 7, wherein the outer perimeter further defines a radially inward relief step disposed above the contact ridge.

9. The apparatus of claim 8, wherein the eccentric clamp disk comprises a lower body portion comprising the contact ridge and an upper body portion; and wherein a diameter of the lower body portion is larger than a diameter of the upper body portion.

10. The apparatus of claim 1, wherein the eccentric clamp disk comprises two grip tabs disposed opposite each other about the hub center.

11. The apparatus of claim 1, wherein the eccentric clamp disk comprises a clamp disk outermost diameter and a clamp disk center; and wherein the clamp disk center is offset from the hub center by less than four percent (4%) of the clamp disk outermost diameter.

12. An apparatus, comprising:
an eccentric clamp disk;
a hub nested in the eccentric clamp disk; and
a securing mechanism configured to fix the hub onto a flat surface;
wherein the hub and the eccentric clamp disk are sized and shaped to define a gap therebetween; and
wherein the gap comprises an upside down frustoconical shape.

13. The apparatus of claim 12, wherein the securing mechanism comprises:
an anchor nut configured to fit in a slot in the flat surface;
a threaded rod secured to the anchor nut and passing through the hub; and
a securing nut configured to cooperate with the threaded rod to clamp the hub onto the flat surface.

14. The apparatus of claim 12, wherein the eccentric clamp disk comprises an outer perimeter that defines an contact ridge and a raked face that tapers inward from the contact ridge toward the flat surface.

15. The apparatus of claim 14, wherein the outer perimeter further defines a radially inward relief step disposed above the contact ridge.

16. The apparatus of claim 15, wherein the eccentric clamp disk comprises a lower body portion comprising the contact ridge and an upper body portion; and wherein a diameter of the lower body portion is larger than a diameter of the upper body portion.

17. The apparatus of claim 12, wherein the eccentric clamp disk comprises two grip tabs disposed opposite each other about a hub center of the hub.

18. An apparatus, comprising:
an eccentric clamp disk;
a hub nested in the eccentric clamp disk; and
a taper on at least one of an inner perimeter of the eccentric clamp disk and an outer perimeter of the hub that is configured to urge the eccentric clamp disk downward when the eccentric clamp disk is pushed laterally into contact with the hub;
wherein the inner perimeter of the eccentric clamp disk and the outer perimeter of the hub are sized and shaped to define a gap there between when the inner perimeter of the eccentric clamp disk is centered around the outer perimeter of the hub.

19. The apparatus of claim 18, wherein when the hub is secured to a flat surface the taper is configured to limit movement of the eccentric clamp disk away from the flat surface, which is effective to retain the eccentric clamp disk on the hub.

20. The apparatus of claim 18, wherein the inner perimeter of the eccentric clamp disk and the outer perimeter of the hub each comprise an upside-down frustoconical shape comprising a respective taper.

* * * * *